US005800873A

United States Patent [19]
Enthoven et al.

[11] Patent Number: 5,800,873
[45] Date of Patent: Sep. 1, 1998

[54] PROCESS FOR THE PRODUCTION OF SEALED PACKAGING CONTAINERS AND THE USE OF A SEALING COATING FOR COATING PLASTICS FILMS

[75] Inventors: Nicolaas Leonardus Maria Enthoven, Tiel; Jürgen Erwin Lemke, Buren; Peter Eric van Rijn, Tiel; Henricus Peturs Gemma van Sommeren, West Maas en Waal, all of Netherlands

[73] Assignee: BASF Lacke+Farben AG, Muenster-Hiltrup, Germany

[21] Appl. No.: 316,784

[22] Filed: Oct. 3, 1994

[51] Int. Cl.$^6$ ...................................................... B05D 3/00
[52] U.S. Cl. ............................. 427/393.5; 427/412.1; 427/412.3
[58] Field of Search ................................. 524/460, 833; 523/201; 427/393.5, 412.1, 412.3; 428/516, 520, 35.7

[56] References Cited

U.S. PATENT DOCUMENTS

| | | | |
|---|---|---|---|
| 3,244,655 | 4/1966 | Sullivan et al. | 524/460 |
| 3,666,704 | 5/1972 | Keppler et al. | 524/460 |
| 4,254,004 | 3/1981 | Abbey | 524/460 X |
| 4,267,094 | 5/1981 | Huhn et al. | 524/460 X |
| 4,305,859 | 12/1981 | McEwan et al. | 524/817 X |
| 4,654,397 | 3/1987 | Mueller-mall et al. | 524/460 |
| 4,912,147 | 3/1990 | Pfoehlen et al. | 524/460 |
| 5,196,504 | 3/1993 | Scholz et al. | 524/460 X |
| 5,284,905 | 2/1994 | Chen et al. | 524/460 X |
| 5,354,800 | 10/1994 | Suzuki et al. | 524/460 |
| 5,385,967 | 1/1995 | Bauer et al. | 524/460 X |
| 5,405,879 | 4/1995 | Uemae et al. | 523/201 |
| 5,461,103 | 10/1995 | Bafford et al. | 524/460 |

*Primary Examiner*—Judy M. Reddick

[57] ABSTRACT

The present invention relates to a process for the production of sealed packaging containers of plastics films, using a sealing coating based on an aqueous dispersion or solution of acrylate copolymer, where the aqueous dispersion of acrylate copolymer is prepared by emulsion polymerization of from 1 to 15% by weight of $\alpha,\beta$-ethylenically unsaturated carboxylic acids, from 40 to 69% by weight of alkyl esters of acrylic acid having 1–12 carbon atoms in the alkyl radical, from 0 to 55% by weight of alkyl esters of methacrylic acid having 1–12 carbon atoms in the alkyl radical and/or vinylaromatics, and from 0 to 25% by weight of further monomers, the sum of the monomers in each case being 100% by weight. The glass transition temperature being not more than 50° C. and the number-average molecular weight of the acrylate copolymer being 8000–12,000; in the first stage from 5 to 20% by weight of the monomer mixture are polymerized and preferably after renewed addition of emulsifier in the second stage the residual monomer mixture is polymerized in the presence of the polymer obtained in the first stage, the resulting reaction mixture is at least partially neutralized, conventional auxiliaries and additives are added if desired, and the resulting sealing coating is applied to the plastics film and dried.

6 Claims, No Drawings

PROCESS FOR THE PRODUCTION OF SEALED PACKAGING CONTAINERS AND THE USE OF A SEALING COATING FOR COATING PLASTICS FILMS

FIELD OF THE INVENTION

The present invention relates to a process for the production of sealed packaging containers from plastics films, using a sealing coating based on an aqueous dispersion or solution of acrylate copolymer, which is prepared by emulsion polymerization of alkyl esters of acrylic acid and methacrylic acid and of $\alpha,\beta$-ethylenically unsaturated carboxylic acids. The invention furthermore relates to the use of a sealing coating based on an aqueous dispersion of acrylate copolymer for coating plastics films, and to the sealed packaging containers produced by the process according to the invention.

BACKGROUND AND SUMMARY OF THE INVENTION

Plastics films, for example those to be employed for packaging foodstuffs, are provided with adhesive coatings so as to enable an effective seal. The adhesive coatings are either heat-sealing coatings, which are sealable at elevated temperatures, or cold-sealing coatings, which seal at temperatures of from about 0° to 40° C.

Cold-sealing coatings and their properties are described, for example, in by L. Placzek in Coating, 18 (4), page 94 to 95, 1985. Cold-sealing coatings are preferably applied from the aqueous phase. In many cases aqueous dispersions are employed whose main constituent is a natural latex. Cold-sealing coatings of this kind conventionally contain, in addition to the natural latex, dispersions of plastic polymers, dispersions of plasticizers, antiaging agents, stabilizers and antiblocking additives. Pressure-sensitive adhesives which are employed in the cold-sealing process are employed in particular in the packaging of foodstuffs, for example packaging for chocolates and ices. The disadvantages of the cold-sealing coatings based on natural rubber latices consist in particular in that the coating compositions are of inadequate stability and in some cases have to be provided with physiologically unacceptable antiaging agents and stabilizers. In addition, many of the coatings have an odor which in some cases can be transmitted to the contents.

Cold-sealing coatings are also known from U.S. Pat. No. 5,070,164, U.S. Pat. No. 4,898,787 and U.S. Pat. No. 4,888,395. U.S. Pat. No. 4,898,787 and U.S. Pat. No. 5,070,164 disclose sealable coating compositions for sealing plastics films, for example polypropylene films. The sealing coatings are based on emulsion polymers which are prepared by emulsion polymerization of monomers selected from alkyl acrylates and vinylidene chloride, vinyl acetate, alkyl methacrylates and styrene and from methacrylic acid, acrylic acid, itaconic acid and maleic acid. The emulsion copolymers have an average molecular weight of from approximately 20,000 to 150,000 and a glass transition temperature of from approximately −15° C. to approximately +15° C. The copolymers are prepared in a two-stage emulsion copolymerization process.

U.S. Pat. No. 4,888,395 discloses core/shell copolymers which can be employed in cold-sealing coatings.

The disadvantages of the known cold-sealing coatings based on aqueous polyacrylate dispersions consist in that, because of their low glass transition temperature, they have poor antiblocking properties, i.e. during storage and use plastics films coated with cold-sealing coatings, when stored over prolonged periods under normal storage conditions in the form of rolls, show a tendency to adhere to the mutually superposed layers of film. In addition, they unavoidably require the application of a release coating layer on the other side of the film.

Heat-sealing coatings are used because they do not block with respect to other films, for example polyolefin films.

Uncoated plastics films, for example of polypropylene, generally have very high heat-welding temperatures and a very narrow heat-welding range. Uncoated, oriented polypropylene in particular has a tendency to lose its orientation and to shrink at the high welding temperatures required.

It is known to provide plastics films with adhesive coatings in order to improve the heat-welding properties.

Heat-sealing coatings on plastics films are sealed at elevated temperatures, normally above 90° C. Typical heat-sealing coatings are described in, for example, U.S. Pat. No. 3,753,769, U.S. Pat. No. 4,565,739, U.S. Pat. No. 4,564,559, U.S. Pat. No. 4,058,645, DE-A-24 40 112, U.S. Pat. No. 4,403,464, U.S. Pat. No. 5,017,430 and U.S. Pat. No. 4,749,616. U.S. Pat. No. 3,753,769 describes terpolymer coating compositions based on acrylate resin, which are used for coating polyolefin films and are sealed at temperatures above 95° C. The coating compositions comprise copolymers or interpolymers of an $\alpha,\beta$-ethylenically unsaturated carboxylic acid, an alkyl acrylate ester and an alkyl methacrylate ester. The glass transition temperature of the resins is in the range from approximately 38° C. to 60° C.

Heat-sealing coatings generally have good antiblocking properties, i.e. they do not adhere to uncoated plastics films, but a disadvantage is their sealing properties. For instance, high sealing temperatures are unsuitable for packaging containing temperature-sensitive goods. In addition, lower sealing temperatures enable higher filling-line speeds. Attempts are therefore made to keep the sealing temperature of heat-sealing coating compositions as low as possible.

The object of the present invention is therefore to provide a process for the production of sealed packaging containers from plastics film, using a sealing coating based on an aqueous dispersion of acrylate copolymer, the intention being that the coating compositions should be sealable at as low as possible a temperature so as to enable increased line speeds. At the same time, the coating compositions should have good antiblocking properties. The sealing properties should, of course, be excellent, i.e. the packaging containers should have an adequate sealed-seam strength. The sealing coatings used should be stable in odor terms and should conform to foodstuffs regulations. Moreover, the coated plastics films should have excellent slip properties over a wide temperature range and excellent optical properties, for example gloss.

The object of the present invention is surprisingly achieved by a process for the production of sealed packaging containers from plastics films, using a sealing coating based on an aqueous dispersion or solution of acrylate copolymer, which is prepared by emulsion polymerization of alkyl esters of acrylic acid and methacrylic acid and of $\alpha,\beta$-ethylenically unsaturated carboxylic acids. The process is characterized in that the aqueous dispersion or solution of acrylate copolymer is prepared by a two-stage emulsion polymerization of a) from 1 to 15% by weight, preferably from 2 to 8% by weight, of $\alpha,\beta$-ethylenically unsaturated carboxylic acids, b) from 40 to 69% by weight, preferably from 48 to 60% by weight, of alkyl esters of acrylic acid having 1–12 carbon atoms in the alkyl radical, c) from 30 to 55% by weight, preferably from 35 to 45% by weight, of alkyl esters of methacrylic acid having 1–12 carbon atoms in the alkyl radical and/or vinylaromatic hydrocarbons, and d) optionally up to 25% by weight, preferably up to 10% by weight, of further monomers, the sum of a), b), c) and d) in each case being 100% by weight, the glass transition temperature of the acrylate copolymer being not more than 50° C. and preferably in the range from 25° C.–50° C., particularly preferably from 30° C. to 50° C., and the number-average molecular weight ($M_n$) of the acrylate copolymer being 8000–12,000. In the first stage of the emulsion polymerization, from 5 to 20% by weight of the monomer mixture of a), b), c) and optionally d) are polymerized at a temperature of 70° C.–90° C. using emulsifiers, polymerization initiators and chain-transfer agents. Preferably after renewed addition of emulsifier in the second stage of the emulsion polymerization, the remaining 80 to 95% by weight of the monomer mixture is polymerized at a temperature of 70° C.–90° C. in the presence of the polymer obtained in the first stage of the emulsion polymerization. The resulting reaction mixture is at least partially neutralized by the addition of bases, and, if desired, conventional auxiliaries and additives are added. The sealing coating obtained is applied to the plastics film and dried.

DETAILED DESCRIPTION

The sealed packaging containers produced by the process according to the invention have excellent sealed-seam strengths and excellent optical properties. The coated plastics films have excellent antiblocking properties, i.e. they do not become stuck on contact with uncoated plastics films. In addition, it is particularly advantageous that sealing can be carried out at relatively low temperatures. The sealing temperature is generally from 20° to 30° C. lower than the sealing temperature when using conventional heat-sealing coatings. This enables the line speed, at the same sealing temperature, to be increased. A further advantage is that the release coating on the other side of the film, which is required when using conventional cold-sealing coatings, is not absolutely necessary in the process according to the invention.

Preferred plastics films are polyolefin films, for example polyethylene and polypropylene films. These films are particularly preferably of polypropylene, especially oriented polypropylene.

The sealing coating used is based on an aqueous dispersion or solution of acrylic copolymer, which is prepared by a two-stage emulsion polymerization of a) from 1 to 15% by weight, preferably from 2 to 8% by weight, of α,β-ethylenically unsaturated carboxylic acids, b) from 40 to 69% by weight, preferably from 48–60% by weight, of alkyl esters of acrylic acid having 1–12 carbon atoms in the alkyl radical, c) from 30 to 55% by weight, preferably from 35 to 45% by weight, of alkyl esters of methacrylic acid having 1–12 carbon atoms in the alkyl radical and/or vinylaromatics, and d) optionally up to 25% by weight, preferably up to 10% by weight, of further monomers, the sum of a), b), c) and d) in each case being 100% by weight.

Examples of α,β-ethylenically unsaturated carboxylic acids are acrylic acid, methacrylic acid, maleic acid, crotonic acid and mixtures thereof. It is preferred to use α,β-monoethylenically unsaturated monocarboxylic acids. Acrylic acid is particularly preferably employed.

Examples of suitable alkyl esters of acrylic acid having 1–12 carbon atoms in the alkyl radical (component b) are methyl acrylate, ethyl acrylate, propyl acrylate, isopropyl acrylate, butyl acrylate, isobutyl acrylate, t-butyl acrylate, n-pentyl acrylate, isopentyl acrylate, hexyl acrylate, n-octyl acrylate, 2-ethylhexyl acrylate and decyl acrylate. Methyl acrylate is preferably employed.

Examples of suitable alkyl esters of methacrylic acid (component c) are methyl methacrylate, ethyl methacrylate, propyl methacrylate, isopropyl methacrylate, n-butyl methacrylate, isobutyl methacrylate, t-butyl methacrylate, n-pentyl methacrylate, isopentyl methacrylate, hexyl methacrylate, n-octyl methacrylate, 2-ethylhexyl methacrylate, decyl methacrylate and dodecyl methacrylate.

Examples of suitable vinylaromatics are styrene, α-alkylstyrene and vinyltoluene, especially styrene. The vinylaromatics are preferably employed in a quantity of from 21 to 42% by weight, based on the total weight of the monomer mixture.

Examples of suitable monomers d) are acrylonitrile and methacrylonitrile. The monomers d) are preferably employed in a quantity of up to 25% by weight, preferably up to 10% by weight, and particularly preferably from 3 to 9% by weight, based on the total weight of the monomer mixture.

The emulsion polymerization for preparing the aqueous dispersion or solution of acrylate copolymer is carried out in aqueous medium in known apparatus, for example in a stirred vessel with heating and cooling devices.

The procedure for adding the monomers may be such that a solution of all the water, the emulsifier and the initiator, or a portion of the initiator, is initially charged and, if some of the initiator is added during the polymerization, then separately therefrom but in parallel therewith the remainder of the initiator is slowly added at the polymerization temperature. It is also possible initially to charge a portion of the water and of the emulsifier and to prepare from the remainder of the water and of the emulsifier, and from the monomer mixture, a preemulsion which is added slowly at the polymerization temperature, the initiator again being initially charged separately or a portion thereof being added separately. It is also possible to add the monomer mixture in the first stage in the form of a preemulsion and in the second stage to add the monomer mixture in bulk, i.e. without water and emulsifier, and to add the initiator separately but in parallel therewith. It is preferred to initially charge a solution of water and emulsifier and to slowly add the monomer mixture, and separately therefrom but in parallel therewith, the initiator in water, at the polymerization temperature. Subsequently, after renewed addition of emulsifier, in the second polymerization stage the remainder of the monomer mixture is metered into the reactor. The remainder of the initiator, which was not charged initially, can also be added completely after the addition of the monomers. However, this subsequent metered addition of initiator is less advantageous.

The polymerization temperature is in the range from 70°–90° C.

Advantageously, the quantitative ratio of monomers to water is selected such that the resulting dispersion of acrylate copolymer has a solids content in the range from 20–40%.

Emulsifiers which can be used are anionic and/or nonionic emulsifiers. Examples of anionic emulsifiers are alkali metal or ammonium salts of sulfuric acid monoesters of alkylphenols or of alcohols, and also the sulfuric acid monoesters of ethoxylated alkylphenols or ethoxylated alcohols, and phosphoric esters of alkoxylated alkylphenols.

Examples of emulsifiers employed are alkali metal salts of sulfuric acid monoesters of nonylphenol reacted with 23 mol of ethylene oxide per mole, alkyl- or arylsulfonate, sodium lauryl sulfate, sodium lauryl ethoxylate sulfate and the alkali metal salt of diesters of sulfosuccinic acid with alcohols having 6–20 carbon atoms. The nonionic emulsifiers which are preferably used are ethers of nonylphenols reacted with 5–23 mol of ethylene oxide.

It is preferred to employ phosphates of alkoxylated alkylphenols, especially phosphates of the reaction product of 1 mol of nonylphenol with 5 mol of ethylene oxide, having an acid number of 125.

Suitable emulsion polymerization initiators are the conventional inorganic peroxodisulfates, preferably potassium peroxodisulfate and ammonium peroxodisulfate, and ammonium or alkali metal peroxydiphosphates. It is also possible to employ redox initiators, for example hydrogen peroxide, benzoyl peroxide, organic per-esters such as perisopivalate, in combination with water-soluble reducing agents such as, for example, ascorbic acid, sulfur compounds, triethylamine, sodium disulfite, hydrazine, hydroxylamine, glycolic acid and tartaric acid.

Examples of suitable chain-transfer agents are mercaptans or polyhalogen compounds or branched aromatic hydrocarbons such as, for example, trimethylbenzene. The chain-transfer agents are preferably employed at all stages of the emulsion polymerization.

In the first stage of the emulsion polymerization, 5 to 20% by weight of the monomer mixture comprising a), b), c) and optionally d) are polymerized at a temperature of 70°–90° C. In the second stage of the polymerization, preferably after renewed addition of emulsifier, the remaining 80 to 95% by weight of the monomer mixture is polymerized in the presence of the polymer obtained in the first stage of the emulsion polymerization.

With particular preference, the aqueous dispersion of acrylate copolymer is prepared by emulsion polymerization of acrylic acid, methyl acrylate and methyl methacrylate.

The glass transition temperature of the acrylate copolymer is at most 50° C. and is preferably in the range from 25° C.–50° C., particularly preferably in the range from 30° C.–50° C. The number-average molecular weight of the polymer is 8000–12,000, measured by gel permeation chromatography against a polystyrene standard and dissolved in tetrahydrofuran.

The resulting acrylate copolymer is at least partially neutralized by the addition of bases, and, if desired, conventional auxiliaries and additives for the production of the aqueous sealing coating are added. The bases employed are ammonia and/or amines, advantageously in the form of an aqueous solution of the neutralizing agent. Ammonia is employed in particular.

The acid number of the acrylate copolymer is in the range from about 10 to 100 mg KOH/g. The sealing coating based on the aqueous dispersion or solution of acrylate copolymer contains suitable auxiliaries and additives as are conventional in the area of seal-coating. These include antiblocking additives, hydrophobicizing agents and additives which have a positive effect on the slip properties and the antifoaming behavior. The slip properties under heat of the coated plastics films can be improved by the addition of solid, finely divided, water-insoluble inorganic materials, for example colloidal silica. Suitable antiblocking additives are finely dispersed minerals and finely divided waxes and wax-like materials which melt at temperatures above the maximum temperatures occurring during storage of the films and which are not soluble in the acrylate copolymer at these temperatures. Examples of natural waxes are paraffin wax, microcrystalline wax, beeswax, carnauba wax, Japan wax and montan wax; examples of synthetic waxes are hydrogenated castor oil, chlorinated hydrocarbon waxes and long-chain fatty acid amides. The abovementioned waxes also lead to an improvement in the cold-slip properties of the coated plastics films, which should be understood as the ability of the films to slip over surfaces at room temperature.

Before applying the aqueous sealing coating to the plastics films, the surface of the films is generally pretreated in order to ensure that the coating adheres firmly to the film. The intention is thereby to avoid the coating peeling off or being pulled off from the film.

This treatment is carried out in accordance with known procedures, for example by chlorinating the plastics film, treatment with oxidizing agents such as chromic acid or hot air, or by steam treatment or flame treatment. The pretreatment used is particularly preferably a high-voltage corona discharge.

After being pretreated, the plastics films are generally precoated in order to ensure the adhesion of the coating to the substrate film. Appropriate precoating agents, or primers, are known from the literature and include, for example, alkyl titanates and polyethyleneimines. The latter are particularly suitable for precoating plastics films. In this context, the polyethyleneimines can be applied to the optionally pretreated plastics films either from organic or from aqueous solution. In this case the concentration of the polyethyleneimine in the aqueous or organic solution may be, for example, 0.5% by weight. Suitable polyethyleneimine primers are described in, for example, DE-A-24 40 112 and U.S. Pat. No. 3,753,769.

The uncoated plastics films generally have a thickness of from 0.015 to 0.060 mm. The aqueous sealing coating is applied to the plastics film in a conventional manner, for example by gravure application, roller application, dipping, or spraying with the aid of the intaglio or flexographic printing process or the reverse-roll application process. The excess aqueous solution can be removed by squeeze rollers or draw-off blades. The sealing coatings should conventionally be applied in a quantity such that, during drying, a smooth, uniformly distributed layer having a weight of from 1 to 4 g/m$^2$ is laid down.

The coating formed by the sealing coating on the plastics film is subsequently dried with hot air, radiated heat or by means of any other conventional means. It is not necessary to apply the release coating layer which is necessary when using cold-sealing coatings.

According to the process of the invention the sealing temperature is generally above ambient temperature. In general it is 20° C.–80° C., preferably at least 30° C. and particularly preferably 40° C.–70° C. Sealing occurs with the application of temperature and pressure. During the application of pressure, the sealing coatings are brought into contact in such a way that they become matted together. The pressures applied are generally in a range from 5–30 bar, preferably in the range from 6–8 bar. Sealing times of from a few 1000ths of a second up to a few 10ths of a second are generally adequate. The dry weight of the sealing coating in the film coating is in general in the range from 1–4 g/m$^2$.

The sealed packaging containers produced by the process according to the invention have outstanding properties with respect to their adhesion to the substrate and to their sealed-seam strength. The latter is preferably at least 250 g/2.54 cm.

The sealing coatings conform to current foodstuffs regulations and are stable in terms of odor. The coatings do not block with respect to untreated plastics films, for example oriented polypropylene. Despite the very good antiblocking properties, the sealing temperature is distinctly below the range of sealing temperatures which is usual for heat-sealing coatings. In general, the sealing temperature is about 30° C. lower than is conventional with current sealing coatings.

In the text below, the invention is illustrated in more detail with reference to illustrative embodiments, where parts are by weight unless stated otherwise.

1.1 Preparation of an Acrylate Emulsion 1 for an Aqueous Sealing Coating 31.1 parts of demineralized water and 0.05 parts of an anionic emulsifier of ester type are weighed into a reaction vessel. The initial charge is heated to about 80°–82° C. A mixture of 16.2 parts of methyl acrylate, 11.9 parts of methyl methacrylate, 1.4 parts of acrylic acid, 0.5 parts of isooctyl thioglycolate and 0.4 parts of water are weighed into the monomer tank and premixed. 0.09 parts of ammonium peroxodisulfate and 0.3 parts of demineralized water are then added. 10% of the contents of the monomer tank are then metered uniformly into the reactor over the course of 30 min at approximately 80° C. Subsequently, 0.8 parts of the anionic emulsifier are added.

The reaction mixture is maintained at the reaction temperature for about 10 min, and then the remaining contents of the monomer tank are metered in uniformly over a period of 3 hours at about 80° C. Subsequently the batch is polymerized for about 2 hours at about 80° C. Then, at a temperature of about 60° C., a mixture of 0.6 parts of ammonia (25% strength) and 6.0 parts of water is added, with stirring. The batch is subsequently adjusted, using a mixture of ammonia (25% strength) and water (mixing ratio 0.6:6.0), to a solids content of 30% and a viscosity of 30 mPa.s at 25° C. The content of ammonia (100%) in the finished coating (solids content 30%) is 0.15 parts.

The resulting acrylate copolymer 1 has a number-average molecular weight $M_n$ of 10,000, an acid number of 37 mg of KOH/g and a glass transition temperature $T_g$ of 42° C. (measured by DSC=differential scanning calorimetry).

1.2 Preparation of an Acrylate Emulsion 2 for an Aqueous Sealing Coating 20.8 parts of demineralized water and 0.03 parts of an anionic emulsifier of ester type are weighed into a reaction vessel. The initial charge is heated at 80°–82° C. A mixture of 10.8 parts of methyl acrylate, 7.9 parts of methyl methacrylate, 0.9 parts of acrylic acid, 0.3 parts of isooctyl thioglycolate and 0.2 parts of water are weighed into the monomer tank and premixed. A solution of 0.06 parts of ammonium peroxodisulfate in 0.3 parts of demineralized water is added to the initial charge. 10% of the contents of the monomer tank are metered uniformly into the reactor over a period of 30 min at approximately 80° C. 0.56 parts of the anionic emulsifier are then added.

The reaction mixture is maintained at the reaction temperature for about 10 min, and then the remaining contents of the monomer tank are metered in uniformly over a period of 3 hours at about 80° C. Subsequently the batch is polymerized for 2 hours at about 80° C. A mixture of 1.6 parts of ammonia (25% strength) and 42.5 parts of water are weighed into a dilution vessel and heated to 70° C. The reactor contents are drained off over about 45 min at about 70° C.

1.3 Preparation of an Acrylate Emulsion 3 for an Aqueous Sealing Coating

An acrylate emulsion 3 is prepared in analogy to the preparation of acrylate emulsion 1, using 1.86 parts of acrylic acid 4.30 parts of methyl methacrylate 23.34 parts of ethyl acrylate 0.79 parts of ammonia (25% strength) and 5.81 parts of water.

The resulting acrylate copolymer 3 has a number-average molecular weight (GPC) of 10,000, an acid number of 49 mg of KOH/g and a glass transition temperature Tg of 4° C. (DSC).

1.4 Preparation of an Acrylate Emulsion 4 for an Aqueous Sealing Coating

An acrylate emulsion 4 is prepared in analogy to the preparation of acrylate emulsion 1, using 1.86 parts of acrylic acid 3.15 parts of acrylonitrile 24.49 parts of ethyl acrylate 0.79 parts of ammonia (25% strength) and 5.81 parts of water.

The resulting acrylate copolymer 4 has a number-average molecular weight (GPC) of 10,000, an acid number of 49 mg/KOH/g and a glass transition temperature of 5° C. (DSC).

2.1 Preparation of an Aqueous Sealing Coating 1

200 parts of the above-described acrylate emulsion 1 are initially taken. 18.0 parts of a commercially available 25% strength emulsion of carnauba wax (commercial product Michemlube 160 from Michelman, U.S.A.) are added slowly with stirring and homogeneously dispersed by stirring for 5 minutes.

2.2 Preparation of an Aqueous Sealing Coating 2

200 parts of the above-described acrylate emulsion 3 are initially taken. 79.60 parts of a commercially available colloidal $SiO_2$ paste (commercial product Ludox AM) are added with stirring and homogeneously dispersed by stirring. Adding ammonia if appropriate, the pH of the sealing coating is adjusted to values between 7.2 and 7.5.

2.3 Preparation of an Aqueous Sealing Coating 3

200 parts of the above-described acrylate emulsion 4 are initially taken. 0.59 parts of Syloid ED 3 (5% strength dispersion in water) and 30 parts of a commercially available, colloidal $SiO_2$ paste (commercial product Ludox AD 30) are added with stirring and homogeneously dispersed by stirring. Adding ammonia if appropriate, the pH of the sealing coating is adjusted to values between 7 and 8.

3. Application of the Sealing Coatings 1–3

The coatings are applied using a doctor blade to polyethyleneimine-primed, oriented polypropylene 29MB210 from Mobil Plastics, Belgium. The application weight is 1.5±0.2 g/m². The coated film is dried in a Helios laboratory oven for 15 s at a max. surface temperature of 95° C.

These coated films are used to determine the coefficient of friction and the blocking resistance with respect to the coated or uncoated reverse of the film. In addition, the sealed-seam strength is determined. The measured results are shown in Table 1.

Coefficient of Friction

The coefficient of friction was determined using the Altek 9505A device from Altek, within a period of 30 min after application of the sealing coatings, in the application direction.

The blocking resistance is tested in 2 ways:

1.) 24 hours at 47° C., 0.5 kg/cm²
   Test coating against uncoated outer face
2.) 24 hours at 47° C., 0.5 kg/cm²
   Test coating against acrylic-coated outer face.

Assessment takes place on the basis of the separation effect, the rating 0 denoting the complete absence of any blocking while the rating 5 indicates total blocking.

Sealed-seam Strength

Two 25 mm wide strips of the above-described coated polypropylene films of Examples 1 to 3 were sealed at a sealing temperature of less than 80° C. and a sealing pressure of 5 bar. In each case the sealed-seam strength was determined using the "Testometric 100 D" device from H. Messmer, London, at a speed of 300 mm/min and a measured width of 25 mm. The results are given in Table 1.

TABLE 1

|  | Example 1 | Example 2 | Example 3 |
|---|---|---|---|
| Coefficient of friction | 0.010 | 0.030–0.060 | 0.06–0.12 |
| Blocking resistance uncoated face | 0.5 | 0.5 | 0.5 |
| acrylic-coated face | 0.5 | 1 | 1 |
| Sealed-seam strength (g/25 mm) | 300–400 | 300–400 | 130* |

*Sealed-seam strength after sealing at room temperature

We claim:

1. A process for the production of sealed packaging containers from plastics films, comprising the step of applying to a plastics film a sealing coating based on an aqueous dispersion or solution of acrylate copolymer, which is prepared by emulsion polymerization of alkyl esters of acrylic acid and methacrylic acid and of α,β-ethylenically unsaturated carboxylic acids, wherein the aqueous dispersion or solution of acrylate copolymer is prepared by a two-stage emulsion polymerization of a monomer mixture, wherein the monomers consist essentially of:

a) from 1 to 15% by weight of α,β-ethylenically unsaturated carboxylic acids,
   b) from 40 to 69% by weight of alkyl esters of acrylic acid having 1–12 carbon atoms in the alkyl radical,
   c) from 0 to 55% by weight of a compound selected from the group consisting of alkyl esters of methacrylic acid having 1–12 carbon atoms in the alkyl radical, vinylaromatics, and mixtures thereof, and
   d) from 0 to 25% by weight of further monomers, the sum of a), b), c), and d) in each case being 100% by weight of total monomers employed, the glass transition temperature (Tg) of the acrylate copolymer being not more than 50° C., and the number-average molecular weight ($M_n$) of the acrylate copolymer being 8000–12,000; and further wherein from 5 to 20% by weight of the monomer mixture is polymerized at a temperature of 70° C.–90° C. using emulsifiers, polymerization initiators and chain-transfer agents in the first stage of the emulsion polymerization, and in the second stage of the emulsion polymerization, the remaining 80 to 95% by weight of the monomer mixture is polymerized at a temperature of 70° C.–90° C. in the presence of the polymer obtained in the first stage of the emulsion polymerization, the resulting reaction mixture is at least partially neutralized by the addition of bases and the sealing coating obtained is applied to the plastics film and dried.

2. A process according to claim 1, wherein the aqueous dispersion or solution of acrylate copolymer is prepared by emulsion polymerization of acrylic acid, methyl acrylate and methyl methacrylate.

3. A process according to claim 1, wherein the solids content of the aqueous dispersion or solution of acrylate copolymer is in the range of 20–40% by weight.

4. A process according to claim 1, wherein the plastics film is coated with a primer before applying the sealing coating.

5. A process according to claim 1, wherein sealing is carried out at a sealing temperature of from 20° to 80° C.

6. A process according to claim 1, wherein compound c) comprises from 30 to 55% by weight of total monomers employed.

* * * * *